US012469598B1

(12) United States Patent
Marin et al.

(10) Patent No.: US 12,469,598 B1
(45) Date of Patent: Nov. 11, 2025

(54) SYSTEMS AND METHODS FOR STREAMLINING HEALTHCARE EQUIPMENT RENTALS

(71) Applicant: US MED-EQUIP, LLC, Houston, TX (US)

(72) Inventors: Jose Antonio Marin, Houston, TX (US); Eric S. Tyler, Houston, TX (US); Narsimulu Venkata, Houston, TX (US); Pranav Patel, Houston, TX (US)

(73) Assignee: US Med-Equip, LLC, Houston, TX (US)

( * ) Notice: Subject to any disclaimer, the term of this patent is extended or adjusted under 35 U.S.C. 154(b) by 6 days.

(21) Appl. No.: 18/661,386

(22) Filed: May 10, 2024

(51) Int. Cl.
*G16H 40/40* (2018.01)
*G16H 10/60* (2018.01)

(52) U.S. Cl.
CPC ............. *G16H 40/40* (2018.01); *G16H 10/60* (2018.01)

(58) Field of Classification Search
CPC ................................ G16H 40/40; G16H 10/60
See application file for complete search history.

(56) References Cited

U.S. PATENT DOCUMENTS 9,959,584 B1 * 5/2018 Frank .................... G06F 16/285

FOREIGN PATENT DOCUMENTS

EP 4064228 A1 * 9/2022 ........... G06V 30/416

OTHER PUBLICATIONS

Greenbaum et. al. "Improving documentation of presenting problems in the emergency department using a domain-specific ontology and machine learning-driven user interfaces." International Journal of Medical Informatics. vol. 132, Dec. 2019, 103981 (Year: 2019).*

\* cited by examiner

*Primary Examiner* — Linh Giang Le
(74) *Attorney, Agent, or Firm* — Jonathan Pierce; Derek V. Forinash; Porter Hedges LLP

(57) ABSTRACT

A system integrates a medical facility's application used for the population of Electronic Medical Records (EMRs) or Electronic Health Records (EHRs) with a rental's company ordering and invoicing application(s). For example, the system may allow personnel to admit patients and rent medical equipment, and/or to discharge patients and return medical equipment, at the same time. The system can automatically process electronic forms, schedule clinicians' requests for equipment delivery, pick up of equipment, or patient transfers, and populate electronic records of invoices. A method for automatically ordering and/or returning healthcare equipment rentals utilizes the system.

16 Claims, 3 Drawing Sheets

SYSTEMS AND METHODS FOR STREAMLINING HEALTHCARE EQUIPMENT RENTALS

FIELD OF THE INVENTION

This disclosure relates generally to healthcare informatics that involve information communication technology adapted for handling or processing patient-related healthcare data. The disclosure relates more particularly to the streamlining of healthcare equipment rentals, such as specialty beds or therapeutic support surfaces.

BACKGROUND OF THE INVENTION

The rental process of medical equipment involves several tasks, such as, ordering, returning, and invoicing. Importantly, the rental process should be accurate and fast in order to ensure delivery of the right equipment at the right time for a patient in need.

However, the rental process of medical equipment can currently consume valuable time from clinicians attending to patients. In particular, clinicians may be required to use a different system or learn new processes to order medical equipment for their patients. Furthermore, the rental process may need complicated application programming, which is usually required to avoid exposing private health information of patients to cybercriminals.

In view of the foregoing, there is a need for healthcare informatics for streamlining healthcare equipment rentals.

SUMMARY

The disclosure generally describes the integration of an application for entering patient-related healthcare data with an application for managing the ordering, returning, and/or invoicing of rentals of medical equipment.

In some aspects, the disclosure describes a system that integrates a medical facility's application used for the population of Electronic Medical Records (EMRs) or Electronic Health Records (EHRs) with a rental's company ordering and invoicing application(s). The integration can take advantage of known Health Insurance Portability and Accountability Act (HIPAA)-secure technology, robotic process automation, artificial intelligence, and machine learning to provide the medical facility's personnel with a simple and efficient rental process. The integration can be done efficiently, for example, in less than forty work hours, and adding new locations can be as easy as less than one hour or two.

The system can streamline healthcare equipment rentals by aligning the current medical facility's processes and the ordering (i.e., delivery), returning (i.e., pick up), and/or invoicing processes of the rentals. For example, the system may allow personnel to admit patients and rent medical equipment, and/or to discharge patients and return medical equipment, at the same time.

The system can also streamline healthcare equipment rentals by automating several clerical tasks that are usually performed manually. For example, the system automatically processes information entered on EMRs or EHRs and schedule the processes to respond to the clinicians' requests for equipment delivery, pick up of equipment, or patient transfers. As such, the human interactions may be limited to when the clinician admits a patient (i.e., selects the equipment to order), transfers a patient (i.e., update the payor of the rental), or discharge a patient (i.e., returns the rental equipment) and the physical preparation, delivery, and pick up of the equipment.

Furthermore, the system can streamline healthcare equipment rentals through a single source for reconciling equipment orders with invoices, thus helping administrators to control their expenditures.

In other aspects, the disclosure describes a method for automatically ordering and/or returning healthcare equipment rentals that utilizes the system set forth herein above.

BRIEF DESCRIPTION OF THE DRAWINGS

For a more detailed description of the embodiments of the disclosure, reference will now be made to the accompanying drawings, wherein.

DETAILED DESCRIPTION

Figure 1:
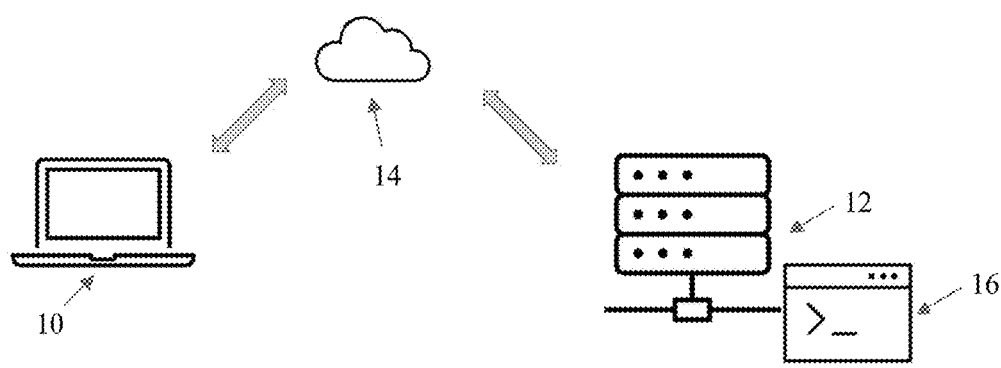
FIG. 1 is a schematic of a system for automatically ordering and/or returning healthcare equipment rentals.

FIG. 1 illustrates a preferred embodiment of a system for automatically ordering and/or returning healthcare equipment rentals, such as specialty beds or therapeutic support surfaces.

The system comprises a computer or mobile device 10 and a server 12, which can communicate via the Internet 14. The computer or mobile device 10 is typically operated by personnel of a medical facility, such as a hospital. The server 12 is typically operated by personnel of a rental company for the healthcare equipment, and wherein the rental company provides the delivery and pick up of the healthcare equipment.

A known software, such as provided by Epic Systems, allows an Electronic Health Record (EHR) or an Electronic Medical Record (EMR) of a patient to be displayed on a screen of the computer or mobile device 12. In particular, the known software allows personnel of the medical facility to enter medical coding information on an ordering template on the EHR or the EMR. In some cases, specific medical coding of any of a plurality of specialty beds or therapeutic support surfaces (referred to herein as an indicator) and other relevant patient information, such as patient height and weight, can already be entered on the ordering template made available by the known software. In other cases, an ordering template (e.g., a lab ordering template) on the EHR or the EMR of patients can be modified for allowing the medical coding of any of a plurality of specialty beds or therapeutic support surfaces and the other relevant patient information, such as patient height and weight, to be entered.

Preferably, actions of a Print, Fax, Share, or eMail button on the EHR or the EMR of patients are modified to automatically take a screenshot of the screen of the computer or mobile device 10, generate an electronic form, and transmit the electronic form to the server 12 in a secure way (e.g., complying with the privacy standard set forth in the Health Insurance Portability and Accountability Act). Typically, screenshots may be taken, and corresponding forms may be generated and transmitted at the admission of the patient in a department of the medical facility, at the transfer of the patient in another department of the same or a different medical facility, and/or at the discharge of the patient.

The server 12 receives the electronic forms in the form of encrypted data, and with the help of its artificial intelligence and machine learning models, processes the information on the electronic forms, generates the equipment requests (e.g., order requests, transfer requests, return requests), display the requests on a terminal 16, and populates electronic records used to generate the equipment rental invoices. The server 12 may eliminate at least three or four levels of human interaction.

Figure 2:
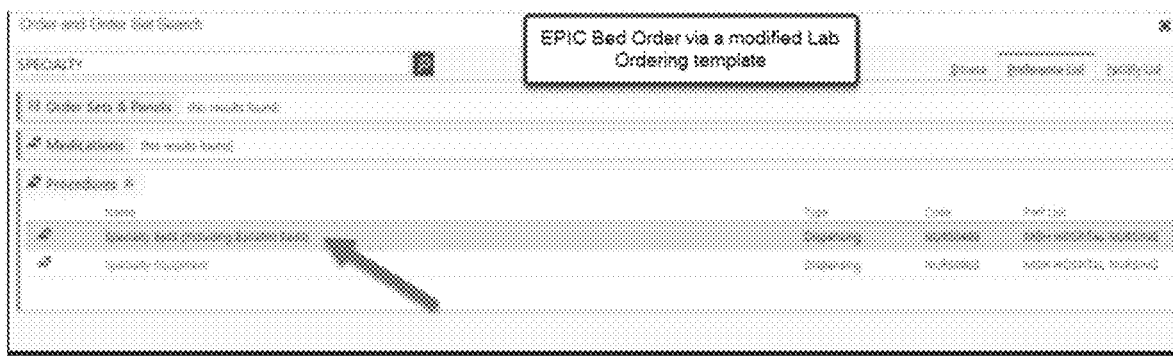
FIG. 2 is a graphical interface for entering patient-related healthcare data that includes a scrolling menu listing procedures, wherein the list of procedures has been modified to facilitate the ordering and/or returning healthcare equipment rentals.
Figure 3:
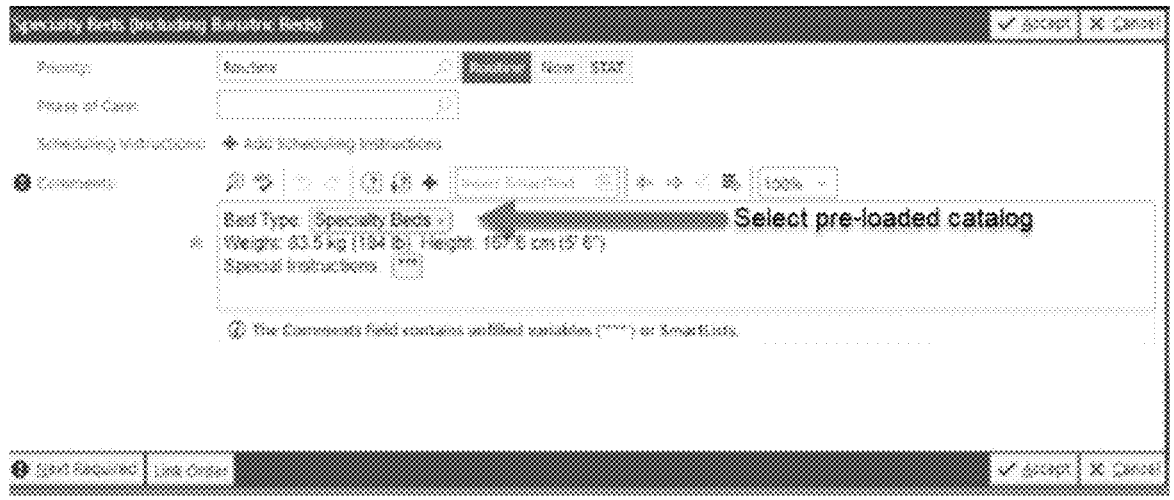
FIG. 3 is a graphical interface that includes a customized selection menu for the healthcare equipment to rent, and accepts additional information related to the description of the healthcare equipment.
Figure 4:
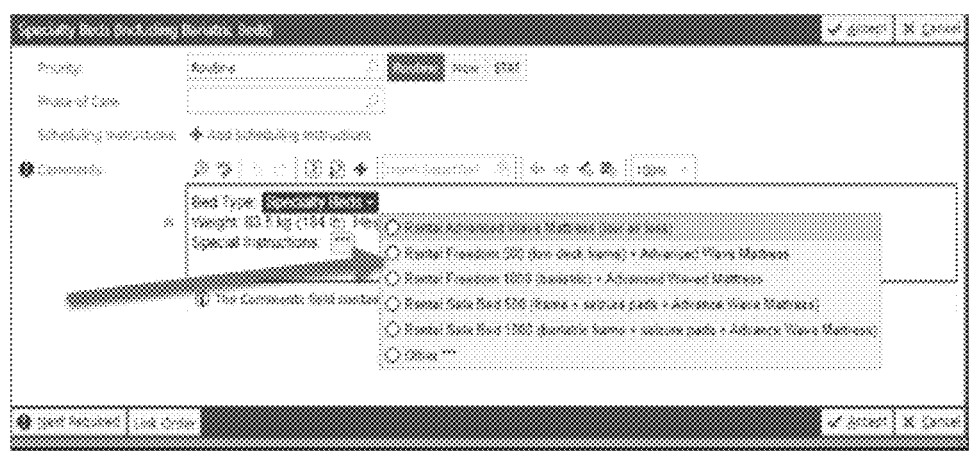
FIG. 4 is the graphical interface shown in FIG. 3 illustrating the selection menu, wherein the selection menu lists the entries of a pre-loaded catalog of healthcare equipment available for rent.

FIGS. 2, 3 and 4 illustrate a preferred example of an ordering template (e.g., a lab ordering template) on the EHR or the EMR of patients that has been modified by an EHR/EMR administration team, for example, in a hospital.

The EHR/EMR administration team may modify an EHR/EMR ordering template displayed on the screen of the computer or mobile device 12 for allowing indicators of any of a plurality of specialty beds or therapeutic support surfaces and the other relevant patient information, such as patient height and weight, to be entered.

In this example, FIG. 2 illustrates that "Specialty Beds" may be added to a scrolling menu listing procedures. FIG. 3 illustrates that a popup window may open when "Specialty Beds" is selected on the scrolling menu shown in FIG. 2. The popup window may include a selection menu for the healthcare equipment to rent. The popup window may also accept additional information, such as patient height, and patient weight. FIG. 4 illustrates that the selection menu of the popup window shown in FIG. 3 may list the entries of a pre-loaded catalog of healthcare equipment available for rent. Each entry on the pre-loaded catalog includes an indicator (e.g., a standard description) for the healthcare equipment.

Figure 5:
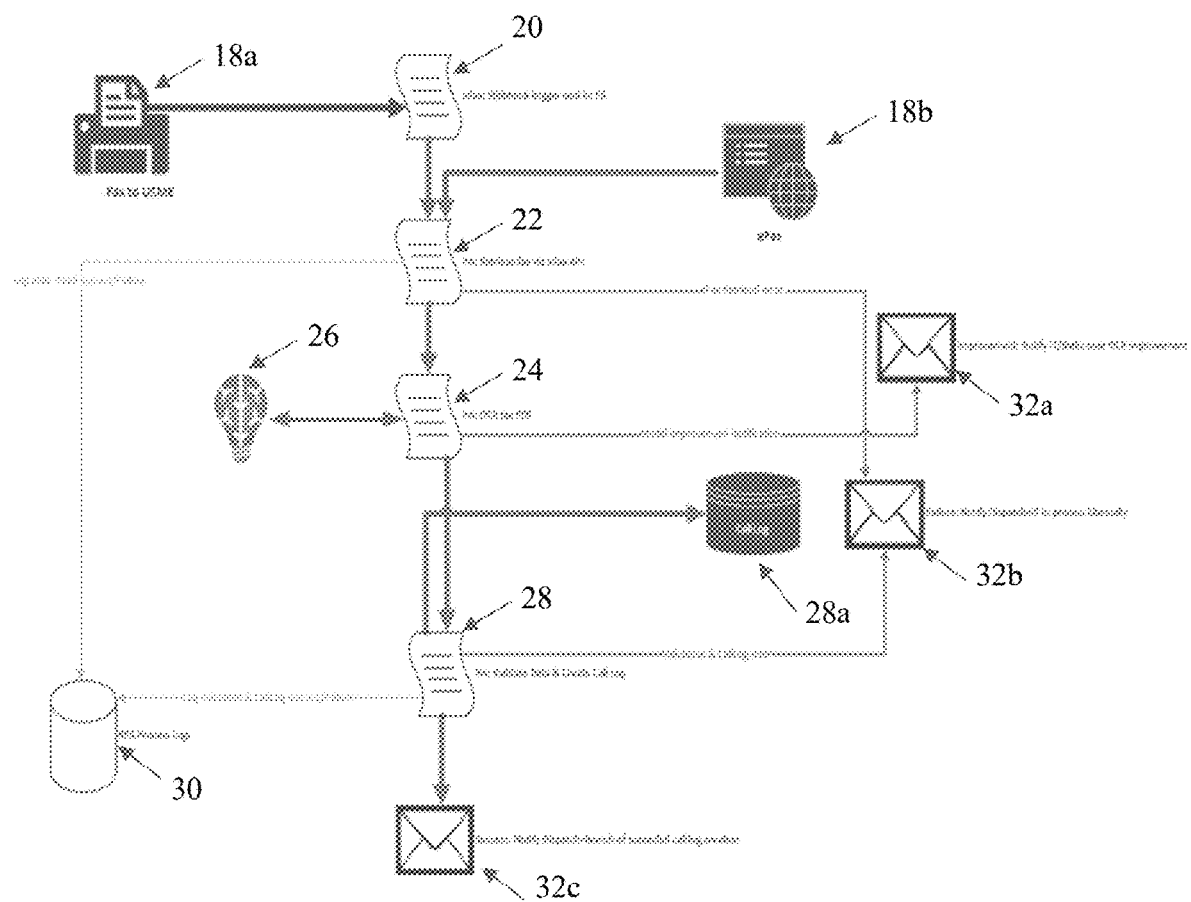
FIG. 5 is a flowchart of a method for automatically ordering and/or returning healthcare equipment rentals.

FIG. 5 illustrates a preferred embodiment of a flowchart of a method for automatically ordering and/or returning healthcare equipment rentals, such as specialty beds or therapeutic support surfaces.

At step 18a or 18b, an electronic form (Fax, eFax or eMail) is sent by the system, wherein the electronic form is derived from an EHR or EMR displayed on the computer or mobile device 12, for example, at a hospital. The EHR or EMR may be displayed either at the admission, transfer, or discharge of a patient.

In some cases, such as when a Fax is sent at step 18a, an HTTP-based callback function (e.g., a webhook) may allow the electronic form to be transmitted at step 20 from the API of a secondary application (e.g., a Fax application) to the API of a primary application (e.g., a secured eFax application or a secured eMail inbox).

At step 22, a Robotic Process Automation (RPA) bot programmed on server 16 detects the arrival of the electronic form and retrieves the electronic form.

At step 24, the RPA bot processes the electronic form using an OCR AI-trained tool to extract information in the electronic form. The OCR AI-trained tool is trained to better recognize characters or sequences of characters, such as distinguishing the upper-case letter "O" from the digit "0," the lower-case letter "l" from the digit "1," etc.

At step 26, the information extracted at step 24 results are classified by a Machine Learning model. The Machine Learning process is typically "taught" to associate sequences of characters on an electronic form to electronic records that are required to respond to orders for equipment, pick up of equipment, or patient transfers, prior to step 26. However, in some cases, the Machine Learning model may be improved on at step 26 with the assistance of a human operator (e.g., a personnel of the rental company).

In the example shown in FIG. 5, particular sequences of characters are associated to one of the following electronic records at step 26: an Indicator of predefined equipment, Patient Height, Patient Weight, Patient name or EHR/EMR number, Ordering department, Order location, Date and time of ordering, Date and time of need, Order number/Purchase Order/Approval ID, and Nurse and approvers contact information.

At step 28, the extraction of step 24 and classification of step 26 are validated when all the electronic records corresponding to a request of one of a delivery for equipment (i.e., an equipment order), a pick up of equipment (i.e., an equipment return), or a patient transfer (i.e., a payor update), have been associated with information extracted from the electronic form. An event corresponding to the arrival of the electronic form at step 22 can be logged on the call log 28a.

At step 30, the electronic records corresponding to the request of one of a delivery for equipment, a pick up of equipment, or a patient transfer, are transferred to the rental's company ordering and/or invoicing application(s). Thus, hospital requests can now be processed through the established processes within the rental company ordering and/or invoicing application(s). In particular, the request of one of a delivery for equipment, a pick up of equipment, or a patient transfer, and its electronic records, may be displayed on the terminal 16. As such, a human operator (i.e., a personnel of the rental company) may engage in the physical preparation, delivery, and pick up of the equipment.

At steps 32a, 32b, and/or 32c, Success or Failure notifications are sent to corresponding parties.

In addition to the foregoing, the disclosure also contemplates at least the following embodiments 1-16. It should be noted that any element of any of embodiments 1-10 may further include details related to this element that are disclosed in a paragraph or Figure describing the preferred embodiments without including details of other elements that are disclosed in the same or other paragraph or Figure.

Embodiment 1

Embodiment 1 is a method for automatically ordering and/or returning healthcare equipment rentals. For example, the medical equipment may include a specialty bed or therapeutic support surface.

The method comprises the step of taking a first screenshot of EHR or an EMR displayed on a screen of a computer or mobile device where medical coding for healthcare equipment is displayed. The EHR or the EMR relates to admission of a patient in an ordering department. For example, an ordering template on the EHR or the EMR of patients may be modified for allowing the medical coding of any of a plurality of specialty beds or therapeutic support surfaces and patient height and weight to be entered.

The method comprises the step of generating a first electronic form from the first screenshot, wherein the first electronic form is at least partially encrypted. For example, actions of a print, fax, share, or email button on the EHR or the EMR of patients may be modified to automatically take the first screenshot, generate the first electronic form, and encrypt the first electronic form.

The method comprises the step of transmitting the first electronic form to a server. For example, the actions of a print, fax, share, or email button on the EHR or the EMR of patients may be further modified to automatically transmit the first electronic form to the server. Typically, but not necessarily, the server would be operated by a rental company for the healthcare equipment, and wherein the rental company provides the delivery of the healthcare equipment. The transmitting of the first electronic form may be performed via one of email, fax, efax, messager, or dropbox.

The method comprises the step of causing the server to process the first electronic form with an OCR-AI software to extract at least an indicator of the healthcare equipment, a delivery location, and a date and time of delivery of the healthcare equipment. However, fewer or more information may be extracted. For example, an Indicator of predefined equipment, Patient Height, Patient Weight, Patient name or EHR/EMR number, Ordering department, Order location, Date and time of ordering, Date and time of need, Order number/Purchase Order/Approval ID, and Nurse and approvers contact information, may be extracted. As such, a specialty bed or therapeutic support surface to rent can be selected based on the patient height and weight.

The method comprises the step of automatically scheduling and performing a delivery of the healthcare equipment corresponding to the indicator at the location based on the date and time of delivery.

As such, healthcare rental equipment may be ordered by the ordering department at the same time the EHR or the EMR relating to the admission of a patient is filled.

Embodiment 2

Embodiment 2 is a method as described in embodiment 1, further comprising the step of causing the server to process the first electronic form with the OCR and AI software to extract the ordering department.

The method further comprises the step of taking a second screenshot of an EHR or and EMR displayed on a screen of a computer or mobile device, wherein the EHR or the EMR relates to transfer of the patient to another department. The method further comprises the step of generating a second electronic form from the second screenshot, wherein the second electronic form is at least partially encrypted. The method further comprises the step of transmitting the second electronic form to the server. The method further comprises the step of causing the server to process the second electronic form with the OCR and AI software to extract at least a date and time of transfer of the patient to the other department.

The method further comprises the step of generating an electronic invoice for the rental of the healthcare equipment by the ordering department using at least the indicator of the healthcare equipment, the ordering department, the date and time of the delivery of the healthcare equipment, and the date and time of transfer of the patient to the other department. Optionally, the method further comprises the steps of causing the server to process the second electronic form with the OCR and AI software to extract the other department, and generating an electronic invoice for the rental of the healthcare equipment by the other department using at least the indicator of the healthcare equipment, and the date and time of transfer of the patient to the other department.

As such, the payor for healthcare equipment rental may be updated at the same time the EHR or the EMR relating to the transfer of a patient to the other department is filled.

Embodiment 3

Embodiment 3 is a method as described in embodiment 2, wherein some of the steps are repeated to allow the payor for healthcare equipment rental to be updated more than once.

Embodiment 4

Embodiment 4 is a method as described in embodiment 1, further comprising the step of taking a second screenshot of an EHR or an EMR displayed on a screen of a computer or mobile device, wherein the EHR or the EMR relates to discharge of the patient. The method further comprises the step of generating a second electronic form from the second screenshot, wherein the second electronic form is at least partially encrypted. The method further comprises the step of transmitting the second electronic form to the server. The method further comprises the step of causing the server to process the second electronic form with the OCR and AI software to extract at least a pick up location, and a date and time of pick up of the healthcare equipment.

The method further comprises the step of automatically scheduling and performing the pick up of the healthcare equipment from the location based on the date and time of pick up.

As such, the healthcare rental equipment may be returned by the ordering department at the same time the EHR or the EMR relating to the discharge of the patient is filled.

Embodiment 5

Embodiment 5 is a method as described in embodiment 4, further comprising the step of generating an electronic invoice for the rental of the healthcare equipment using at least the at least indicator of the healthcare equipment, the date and time of the delivery, and the date and time of the pick up of the healthcare equipment.

As such, the method can streamline healthcare equipment rentals through a single source for reconciling equipment orders with invoices.

Embodiment 6

Embodiment 6 as described in embodiment 2 or 3, which allows the payor for healthcare equipment rental to be updated at least once at the same time the EHR or the EMR relating to the transfer of the patient to another department is filled, further comprising the steps discussed in embodiments 4 and/or 5 so that the healthcare rental equipment may be returned at the same time the EHR or the EMR relating to the discharge of the patient is filled, and two (or more) invoices for are generated.

Embodiment 7

Embodiment 7 is a system for automatically ordering and/or returning healthcare equipment rentals. The system comprises a computer or mobile device and a server that can communicate, such as via the Internet.

The computer or mobile device is programmed to:
(i) take a first screenshot of an Electronic Health Record (EHR) or an Electronic Medical Record (EMR) displayed on a screen of the computer or mobile device where medical coding for healthcare equipment is entered for a patient, wherein the EHR or the EMR relates to admission of the patient in an ordering department;
(ii) generate a first electronic form from the first screenshot, wherein the first electronic form is at least partially encrypted; and
(iii) transmit the first electronic form to the server.

The server is programmed to:
(i) process the first electronic form with an optical character recognition (OCR) and artificial intelligence (AI) software to extract at least an indicator of the healthcare equipment, a delivery location, and a date and time of delivery of the healthcare equipment; and
(ii) automatically schedule a delivery of the healthcare equipment corresponding to the indicator at the location based on the date and time of delivery.

Preferably, but not necessarily, the server is further programmed to process the first electronic form with the OCR and AI software to extract patient height and weight.

As such, the system of embodiment 7 may be utilized to implement the method of embodiment 1.

Embodiment 8

Embodiment 8 is a system as described in embodiment 7, wherein the computer or mobile device is further programmed to:
(i) take a second screenshot of an EHR or an EMR displayed on a screen of a computer or mobile device, wherein the EHR or the EMR relates to a transfer of the patient to another department;
(ii) generate a second electronic form from the second screenshot, wherein the second electronic form is at least partially encrypted; and
(iii) transmit the second electronic form to the server.

In embodiment 8, the server is further programmed to:
(i) process the first electronic form with the OCR and AI software to extract the ordering department;
(ii) process the second electronic form with the OCR and AI software to extract at least a date and time of transfer of the patient to the other department; and
(iii) generate an electronic invoice for the rental of the healthcare equipment by the ordering department using at least the indicator of the healthcare equipment, the ordering department, the date, and time of the delivery of the healthcare equipment, and the date and time of transfer of the patient to the other department.

As such, the system of embodiment 8 may be utilized to implement the method of embodiments 2 and/or 3.

Embodiment 9

Embodiment 9 is a system as described in embodiment 7, wherein the computer or mobile device is further programmed to:
(i) take a second screenshot of an EHR or an EMR displayed on a screen of a computer or mobile device, wherein the EHR or the EMR relates to discharge of the patient;
(ii) generate a second electronic form from the second screenshot, wherein the second electronic form is one of an encrypted email or an encrypted eFax;
(iii) transmit the second electronic form to the server;

Also, the server is further programmed to:
(i) process the second electronic form with the OCR and AI software to extract at least a pick up location, and a date and time of pick up of the healthcare equipment; and
(ii) automatically schedule pick up of the healthcare equipment from the location based on the date and time of pick up.

And optionally, the server is further programmed to:
(iii) generate an electronic invoice for the rental of the healthcare equipment using at least the at least indicator, the date and time of the delivery, and the date and time of the pick up, of the healthcare equipment.

As such, the system of embodiment 9 may be utilized to implement the method of embodiments 4 and/or 5.

Embodiment 10

Embodiment 10 is a system combining the features as described in embodiment 7, wherein the computer or mobile device is further programmed to:

Specific embodiments of the invention are shown by way of examples in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A method for automatically ordering and/or returning healthcare equipment rentals, comprising:
taking a first screenshot of an Electronic Health Record (EHR) or an Electronic Medical Record (EMR) displayed on a screen of a computer or mobile device where medical coding for healthcare equipment is displayed, wherein the EHR or the EMR relates to admission of a patient in an ordering department;
generating a first electronic form from the first screenshot, wherein the first electronic form is at least partially encrypted;
transmitting the first electronic form to a server;
causing the server to process the first electronic form with an optical character recognition (OCR) and artificial intelligence (AI) software to extract at least an indicator of the healthcare equipment, a delivery location, and a date and time of delivery of the healthcare equipment; and
automatically scheduling a delivery of the healthcare equipment corresponding to the indicator at the location based on the date and time of delivery.

2. The method of claim 1 wherein the server is operated by a rental company for the healthcare equipment, and wherein the rental company provides the delivery of the healthcare equipment.

3. The method of claim 1 wherein the medical equipment includes a specialty bed or therapeutic support surface.

4. The method of claim 3 further comprising causing the server to process the first electronic form with the OCR and AI software to extract patient height and weight, wherein the specialty bed or therapeutic support surface is selected based on the patient height and weight.

5. The method of claim 4 further comprising:
modifying an ordering template on the EHR or the EMR of patients for allowing the medical coding of any of a plurality of specialty beds or therapeutic support surfaces and patient height and weight to be entered.

6. The method of claim 1 wherein the transmitting of the first electronic form is performed via one of email, fax, efax, messager, or dropbox.

7. The method of claim 6 further comprising:
modifying actions of a print, fax, share, or email button on the EHR or the EMR of patients to automatically take the first screenshot, generate the first electronic form, and transmit the first electronic form to the server.

8. The method of claim 1 further comprising:
causing the server to process the first electronic form with the OCR and AI software to extract the ordering department;
taking a second screenshot of an EHR or and EMR displayed on a screen of a computer or mobile device, wherein the EHR or the EMR relates to transfer of the patient to another department;
generating a second electronic form from the second screenshot, wherein the second electronic form is at least partially encrypted;
transmitting the second electronic form to the server;
causing the server to process the second electronic form with the OCR and AI software to extract at least a date and time of transfer of the patient to the other department;
generating an electronic invoice for the rental of the healthcare equipment by the ordering department using at least the indicator of the healthcare equipment, the ordering department, the date and time of the delivery of the healthcare equipment, and the date and time of transfer of the patient to the other department.

9. The method of claim 8 further causing the server to process the second electronic form with the OCR and AI software to extract the other department, and generating an electronic invoice for the rental of the healthcare equipment by the other department using at least the indicator of the healthcare equipment, and the date and time of transfer of the patient to the other department.

10. The method of claim 1 further comprising:
taking a second screenshot of an EHR or an EMR displayed on a screen of a computer or mobile device, wherein the EHR or the EMR relates to discharge of the patient;
generating a second electronic form from the second screenshot, wherein the second electronic form is at least partially encrypted;
transmitting the second electronic form to the server;
causing the server to process the second electronic form with the OCR and AI software to extract at least a pick up location, and a date and time of pick up of the healthcare equipment; and
automatically scheduling pick up of the healthcare equipment from the location based on the date and time of pick up.

11. The method of claim 10 further comprising:
generating an electronic invoice for the rental of the healthcare equipment using at least the at least indicator of the healthcare equipment, the date and time of the delivery, and the date and time of the pick up of the healthcare equipment.

12. A system for automatically ordering and/or returning healthcare equipment rentals, comprising:
a computer or mobile device and a server,
wherein the computer or mobile device is programmed to:
take a first screenshot of an Electronic Health Record (EHR) or an Electronic Medical Record (EMR) displayed on a screen of the computer or mobile device where medical coding for healthcare equipment is entered for a patient, wherein the EHR or the EMR relates to admission of the patient in an ordering department;
generate a first electronic form from the first screenshot, wherein the first electronic form is at least partially encrypted; and
transmit the first electronic form to the server;
wherein the server is programmed to:
process the first electronic form with an optical character recognition (OCR) and artificial intelligence (AI) software to extract at least an indicator of the healthcare equipment, a delivery location, and a date and time of delivery of the healthcare equipment; and
automatically schedule a delivery of the healthcare equipment corresponding to the indicator at the location based on the date and time of delivery.

13. The system of claim 12 wherein the server is further programmed to process the first electronic form with the OCR and AI software to extract patient height and weight.

14. The system of claim 12 wherein the computer or mobile device is programmed to:
take a second screenshot of an EHR or an EMR displayed on a screen of a computer or mobile device, wherein the EHR or the EMR relates to a transfer of the patient to another department;
generate a second electronic form from the second screenshot, wherein the second electronic form is at least partially encrypted;
transmit the second electronic form to the server;
wherein the server is further programmed to:
process the first electronic form with the OCR and AI software to extract the ordering department;
process the second electronic form with the OCR and AI software to extract at least a date and time of transfer of the patient to the other department;
generate an electronic invoice for the rental of the healthcare equipment by the ordering department using at least the indicator of the healthcare equipment, the ordering department, the date, and time of the delivery of the healthcare equipment, and the date and time of transfer of the patient to the other department.

15. The system of claim 12 wherein the computer or mobile device is programmed to:
take a second screenshot of an EHR or an EMR displayed on a screen of a computer or mobile device, wherein the EHR or the EMR relates to discharge of the patient;
generate a second electronic form from the second screenshot, wherein the second electronic form is one of an encrypted email or an encrypted eFax;
transmit the second electronic form to the server;
wherein the server is further programmed to:
process the second electronic form with the OCR and AI software to extract at least a pick up location, and a date and time of pick up of the healthcare equipment; and
automatically schedule pick up of the healthcare equipment from the location based on the date and time of pick up.

16. The system of claim 15 wherein the server is further programmed to generate an electronic invoice for the rental of the healthcare equipment using at least the at least indicator, the date and time of the delivery, and the date and time of the pick up, of the healthcare equipment.

\* \* \* \* \*